US005667626A

United States Patent [19]

Cayford et al.

[11] Patent Number: 5,667,626

[45] Date of Patent: Sep. 16, 1997

[54] MASKING DEVICE HUB PROVIDING TWO POSITION TAPE SUPPORT

[75] Inventors: James D. Cayford, Afton, Minn.; Philip V. Sadrakula, Hudson; Robert H. Heil, New Richmond, both of Wis.; Stanley W. Widmer, Fawn Lake, Minn.

[73] Assignee: Minnesota Mining and Manufacturing Company, St. Paul, Minn.

[21] Appl. No.: 592,886

[22] Filed: Jan. 29, 1996

[51] Int. Cl.$^6$ .............................. B32B 31/08; B32B 35/00

[52] U.S. Cl. .......................... 156/577; 156/527; 156/554; 156/579; 242/578; 242/578.2; 242/588.2; 242/588.6

[58] Field of Search ...................................... 156/577, 527, 156/579, 554; 242/578, 578.2, 588.6, 588.2

[56] References Cited

U.S. PATENT DOCUMENTS

| | | | |
|---|---|---|---|
| 3,152,032 | 10/1964 | Waltz . | |
| 3,753,839 | 8/1973 | Funke et al. ......................... | 156/527 X |
| 3,787,271 | 1/1974 | Wahlquist . | |
| 3,871,940 | 3/1975 | Antonioni . | |
| 4,379,019 | 4/1983 | Pool . | |
| 4,425,182 | 1/1984 | Jones et al. . | |
| 4,508,587 | 4/1985 | Hunter . | |
| 4,913,767 | 4/1990 | Longworth . | |
| 4,915,769 | 4/1990 | Heil et al. . | |
| 4,989,769 | 2/1991 | Longworth et al. . | |
| 4,990,214 | 2/1991 | Heil et al. . | |
| 5,445,703 | 8/1995 | Steeves et al. ........................ | 156/577 X |

FOREIGN PATENT DOCUMENTS

| | | |
|---|---|---|
| 0 607 764 A1 | 7/1994 | European Pat. Off. . |

*Primary Examiner*—Jeff H. Aftergut
*Attorney, Agent, or Firm*—Gary L. Griswold; Walter N. Kirn; William L. Huebsch

[57] ABSTRACT

A tape hub including a support portion defining a peripheral surface around an axis adapted to frictionally receive a cylindrical inner surface of a core wound with tape, and means on the tape hub for positioning a first edge of the length of tape wrapped around the core at either of two discrete tape edge positions axially with respect to the hub. The tape hub is useful on devices that adhere tape along one edge of masking material to afford selecting different amounts of overlap between the tape and the masking material. The tape hub can have a plurality of radially extending hub portions having spaces therebetween and axially extending ribs on the hub portions defining its peripheral surface with the peripheral surface being adapted to frictionally receive the cylindrical inner surface of cores of slightly different inner diameters.

7 Claims, 5 Drawing Sheets

MASKING DEVICE HUB PROVIDING TWO POSITION TAPE SUPPORT

TECHNICAL FIELD

The present invention relates to portable devices for adhering pressure sensitive adhesive coated tape to sheet masking material to provide a composite masking sheet comprising a length of the masking material having tape adhered along and extending widthwise past one edge by which the composite masking sheet can be adhered to a surface to be masked.

BACKGROUND ART

The prior art is replete with portable devices of the type described above that each carry a roll of pressure sensitive adhesive coated tape and a roll of sheet masking material and adhere the tape along the edge of the masking material to form the composite masking sheet as it is withdrawn from the device. U.S. Pat. Nos. 3,787,271; 4,379,019; 4,425,182; and 4,508,587 provide illustrative examples.

The portable device of this type described in U.S. Pat. No. 4,379,019 comprises a frame including a handle adapted for manual engagement to manipulate the device, and tape and masking material hubs mounted on the frame for rotation about spaced generally parallel axes. The tape hub receives the roll of tape and positions a first edge of the length of tape at a predetermined tape edge position axially with respect to the tape and masking material hubs, and the masking material hub receives the roll of masking material and positions a first edge of the length of masking material at a predetermined masking material edge position axially with respect to the hubs with the width of the length of tape extending from the tape edge position past the masking material edge position and the width of the length of masking material extending from the masking material edge position past the tape edge position. The device defines a path for the length of tape from the roll of tape, and a path for the length of masking material from the roll of masking material including a tape path portion from the roll of tape to the periphery of the roll of masking material and a common path portion beginning at the periphery of the roll of masking material where a portion of the tape along its first edge is adhered to a portion of the masking material along its first edge to form a composite masking sheet having opposite edges defined by the second edges of the lengths of tape and masking material. A portion of the coating of pressure sensitive adhesive exposed along the second edge on the length of tape can then be adhered along a surface to be masked to hold the composite masking sheet in a desired position.

When different combinations of tape widths and types of masking material are used on the device, it is sometimes desirable to have more or less of the tape adhered to the masking material. For example, when three quarter inch wide masking tape is used persons often prefer only about ⅜ inch or 0.95 centimeters of overlap between the tape and the masking material to expose more of the adhesive on the tape by which the composite masking sheet will be adhered to a substrate, whereas when wider masking tapes (e.g., up to two inch wide) are used persons often prefer more overlap (e.g., ½ inch or 1.27 centimeters of overlap) to insure good adhesion of the tape to the masking material. The device has been supplied with a flange around the tape hub against which the first edge of the tape on the roll is positioned spaced from a surface on the frame against which the first edge of the masking material in the roll is positioned to normally provide the larger of these overlaps; and a ring has been supplied with the device which can be positioned around the tape hub next to the flange to change the position of the first edge of tape along the hub and provide the smaller of these overlaps. While this works, the ring can become misplaced or lost, particularly if it is not always used.

Also, the tape hub used on the device described above has a generally circular peripheral surface around which the roll of tape is positioned that is defined by closely spaced axially extending ribs. This peripheral surface does not properly accept the nominally three inch diameter tape cores used in rolls of tape of both imperial specification (e.g., United States origin) and metric specification (e.g., European origin) because of the about 0.030 inch difference in their inner diameters. If the core in one of those rolls of tape slides over the tape hub with a proper friction fit, the core in the other is either too big to frictionally engage it, or too small to slide over it. Nor does that peripheral surface easily accommodate differences in the sizes of tape cores in rolls of tape that may result from tension in the tape wrapped about them or changes in humidity.

DISCLOSURE OF THE INVENTION

The present invention provides a device of the type described above including means always present on the tape hub which allows a user to adjust it to overlap and adhere together different amounts of the tape and masking material. Using a preferred embodiment of that means, such adjustment is made simply by the amount of force used to move the tape onto the tape hub, and using other embodiments is made by making one or more adjustment on the hub. Also the hub on that device is adapted to accept nominally three inch diameter tape cores of both United States and European origin (whether or not they are affected by tightly wound tape or humidity conditions) either without any adjustment or with easily made adjustments.

The present invention provides an improvement in the device described above with reference to U.S. Pat. No. 4,379,019 wherein the tape hub includes means on the tape hub for alternately locating the first edge of the length of tape at either of two different discrete tape edge positions to thereby afford changing the width axially of the hubs of the portion of the length of tape along the first edge of the length of tape and the portion of the length of masking material along the first edge of the length of masking material that are adhered together by the device.

In one embodiment, that means on the tape hub for alternately locating the first edge of the length of tape at either of two different discrete predetermined tape edge positions comprises (1) a flange fixed at one end of a support portion of the hub that defines a peripheral surface around the axis adapted to frictionally receive the cylindrical inner surface of the core, which flange is adapted to be engaged by one side surface of the core to define an inner one of the two predetermined tape edge positions, and (2) a plurality of cantilevered members having proximal ends attached to the support portion of the hub and distal ends projecting above its peripheral surface and adapted to be engaged by the side surface of the core on the peripheral surface to define an outer one of the two predetermined tape edge positions. The cantilevered members are resiliently flexible and have cam surfaces on their distal ends adapted to be engaged by the hub and to thereby cause resilient deflection of the distal ends below the peripheral surface to afford axial movement of the core over the distal ends and into engagement with the flange upon manual application of a predetermined force axially of the hub to move the core past the distal ends. Thus, a user can use a first level of force to push the roll of tape over the support portion of the hub and into engagement with the distal ends (which engagement he can feel) and can leave the roll of tape in that position to provide the smaller amount of overlap between the tape and the masking material; or can, after the core in the roll of tape is positioned against those distal ends, apply a significantly higher level of force to push the roll of tape past the distal ends of the cantilevered members and into engagement with the flange, whereupon the cam surfaces on those distal ends cause the cantilevered members to deflect and be positioned along the inner surface of the tape core.

In a second embodiment, that means on the tape hub for alternately locating thee first edge of the length of tape at either of two different discrete predetermined tape edge positions comprises a plurality of rotary members each mounted on the support portion for rotary motion relative to the support portion between outer engaging positions at which an outer set of projections carried by the rotary members project above the peripheral surface where they will be engaged by the side surface of the core on the peripheral surface to define an outer one of the two predetermined tape edge positions, and inner engaging positions at which an inner set of projections carried by the rotary members project above the peripheral surface (and the outer set of projections are below the peripheral surface) where the inner set of projections will be engaged by the side surface of the core on the peripheral surface to define an inner one of the two predetermined tape edge positions. Thus, a user can adjust the rotary members so that either the roll of tape can be pushed over the support portion of the hub into engagement with the outer projections to provide the smaller amount of overlap between the tape and the masking material, or into engagement with the inner projections to provide the larger amount of overlap between the tape and the masking material.

In a third embodiment, that means on the tape hub for alternately locating the first edge of the length of tape at either of two different discrete predetermined tape edge positions comprises (1) a flange fixed at one end of the support portion of the hub which, when engaged by one side surface of the core, defines an inner one of the two predetermined tape edge positions, and (2) a rotary member mounted on the support portion for coaxial rotary motion relative to the support portion between an engaging position at which parts of flexible projections on the rotary member project along the peripheral surface of the hub adjacent the flange where they will be engaged by the side surface of the core on the peripheral surface to space the core from the flange and define an outer one of the two predetermined tape edge positions, and a disengaged position at which the projections are spaced from the flange to afford axial movement of the core into engagement with the flange. Thus, a user can adjust the rotary member so that either the roll of tape can be pushed over the support portion of the hub into engagement with the projections to space it from the flange and provide the smaller amount of overlap between the tape and the masking material, or into engagement with the flange to provide the larger amount of overlap between the tape and the masking material.

The tape hub can be adapted to accept nominally three inch diameter tape cores of either United States or European origin (whether or not they are affected by tightly wound tape or humidity conditions) without any adjustment by providing the tape hub with three radially projecting spaced hub portions, and defining the peripheral surface with widely spaced axially extending ribs at the distal ends of those hub portions. Rolls of tape with tape cores of the largest inner diameter that will be accepted by the tape hub (e.g., the cores of United States origin) will frictionally engage the ribs without significant deformation of the core, whereas rolls of tape with cores of the smaller inner diameters that will be accepted by the tape hub (e.g., the cores of European (particularly from Great Britain) origin which are about 0.030 inch smaller) can also frictionally engage the ribs by becoming slightly flattened in the spaces between the hub portions and in the spaces between ribs on each of the hub portions. Alternatively, the hub can include cam means that can be manually adjusted to increase or decrease the diameter of the hub at its peripheral surface so that it can accept cores of slightly different inner diameters.

BRIEF DESCRIPTION OF DRAWING

The present invention will be further described with reference to the accompanying drawing wherein like reference numerals refer to like parts in the several views, and wherein.

DETAILED DESCRIPTION

Figure 1:
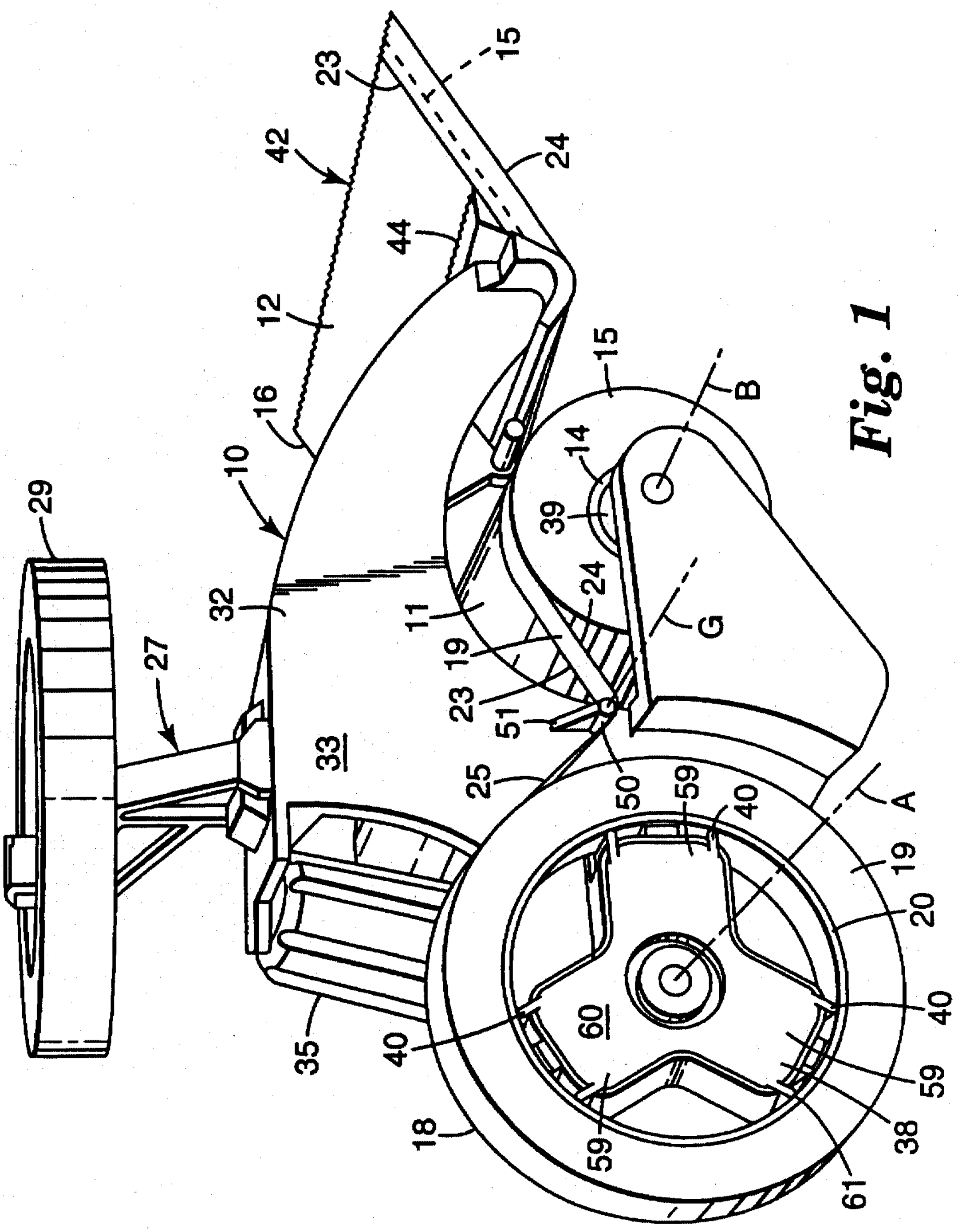
FIG. 1 is a perspective view of a portable device for merging sheet masking material and pressure sensitive adhesive coated tape dispensed from the device including a first embodiment of the tape hub according to the present invention.
Figure 2:
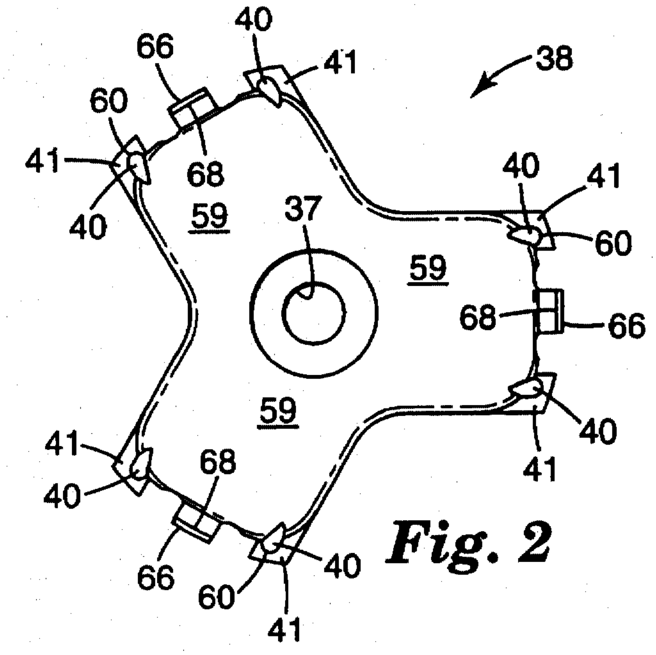
FIG. 2 is an outer end view of the tape hub of FIG. 1.
Figure 3:
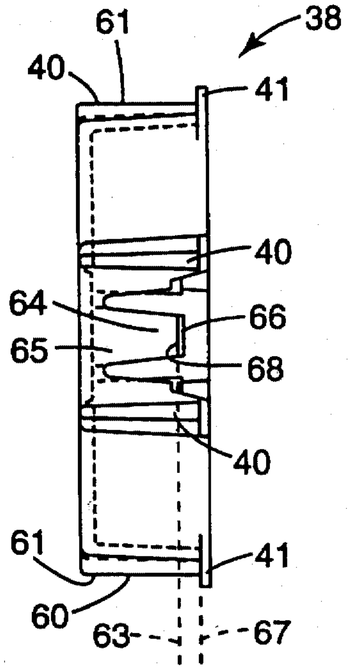
FIG. 3 is a side view of the tape hub of FIG. 1 with dotted lines showing two different positions at which a roll of tape on the hub could be located.
Figure 4:
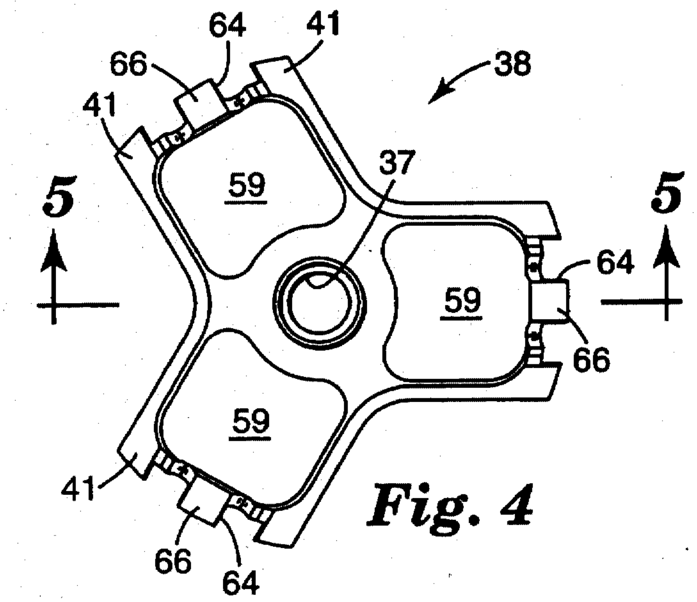
FIGS. 4 is an inner end view of the tape hub of FIG. 1.
Figure 5:
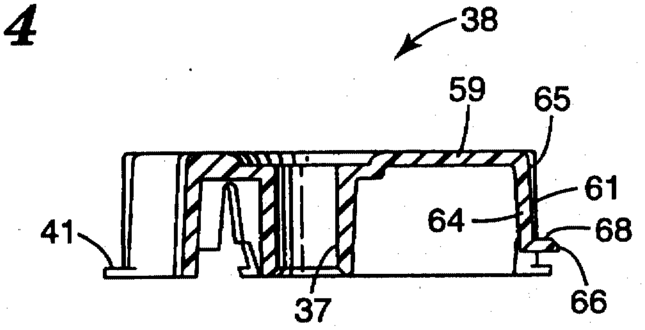
FIG. 5 is a sectional view taken approximately along line 5—5 of FIG. 4.
Figure 6:
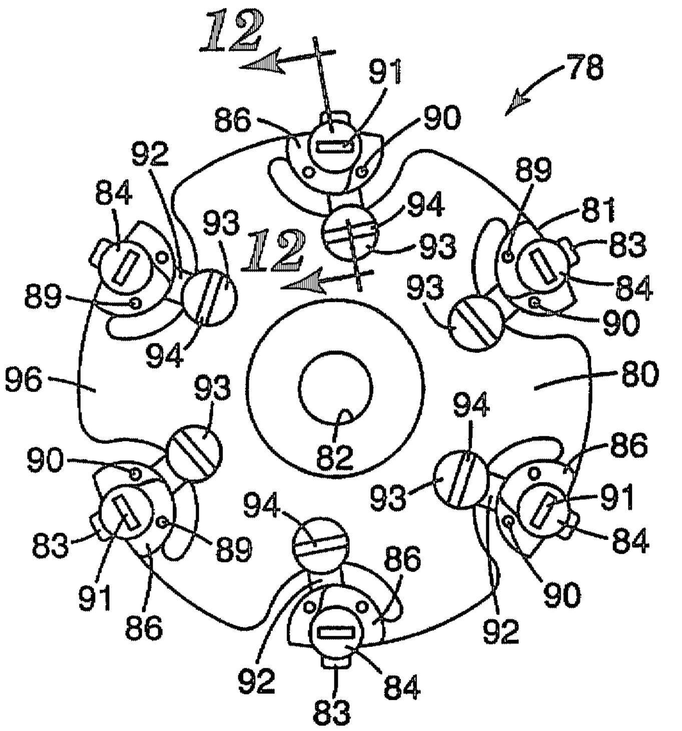
FIG. 6 is an outer end view of a second embodiment of a tape hub according to the present invention.
Figure 7:
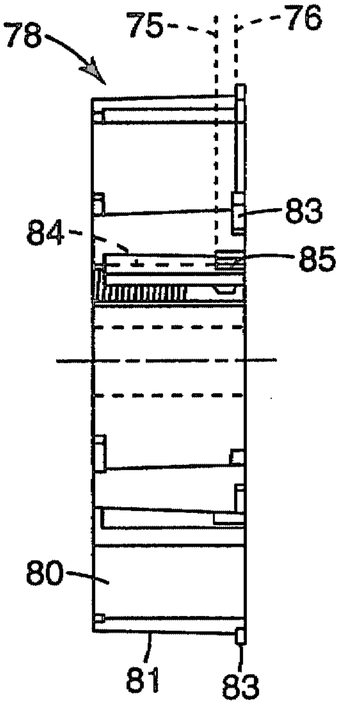
FIG. 7 is a side view of the tape hub of FIG. 6 with dotted lines showing two different positions at which a roll of tape on the hub could be located.
Figure 8:
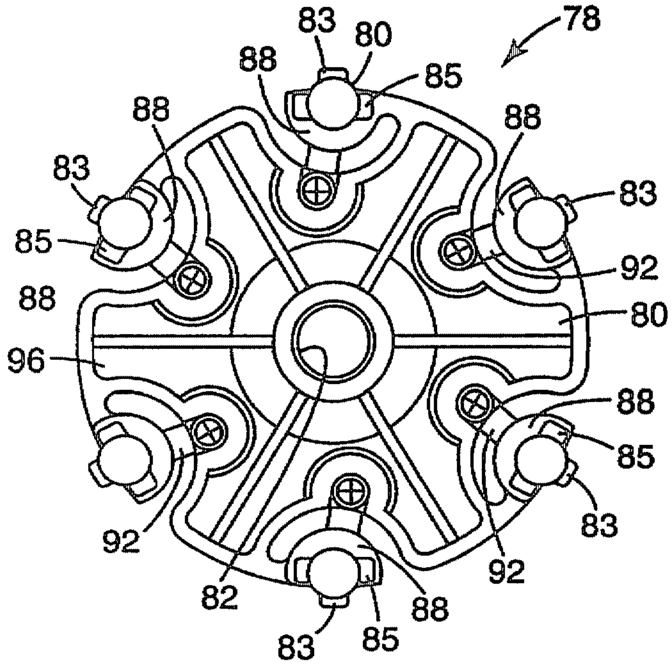
FIG. 8 is an inner end view of the tape hub of FIG. 1.
Figure 12:
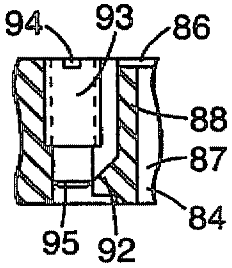
FIG. 12 is a sectional view taken approximately along line 12—12 of FIG. 6.
Figure 9:
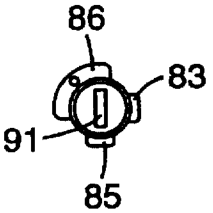
FIGS. 9, 10 and 11 are outer end, side, and inner end views respectively of one of six rotary members included in the tape hub of FIG. 6.
Figure 10:
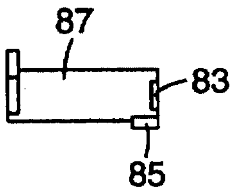
Figure 11:
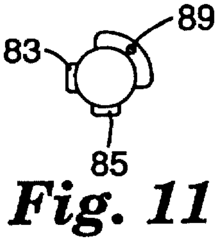
Figure 13:
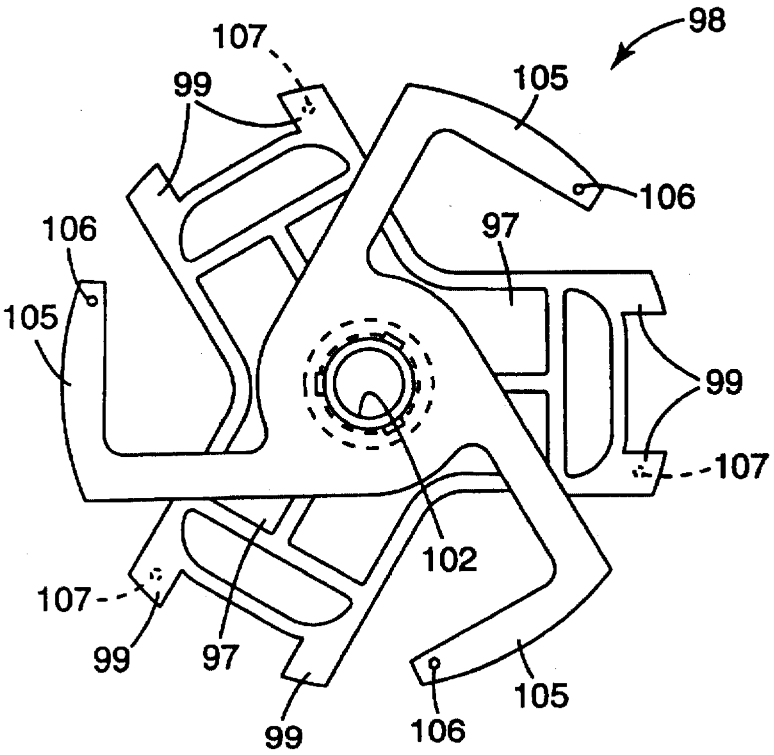
FIG. 13 is an inner end view of a third embodiment of a tape hub according to the present invention with a rotary member on that hub in an inner or disengaged position.
Figure 14:
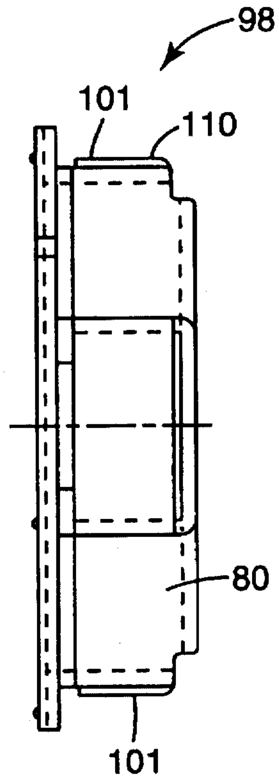
FIG. 14 is a side view of the tape hub of FIG. 13.
Figure 15:
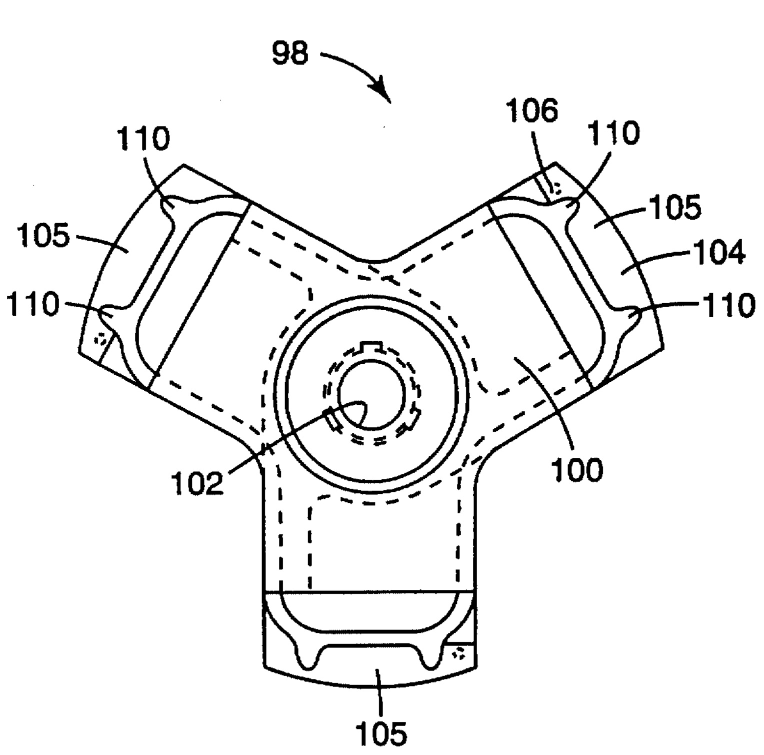
FIG. 15 is an outer end view of the tape hub of FIG. 13 except that the rotary member on that hub is in an outer or engaged position.
Figure 16:
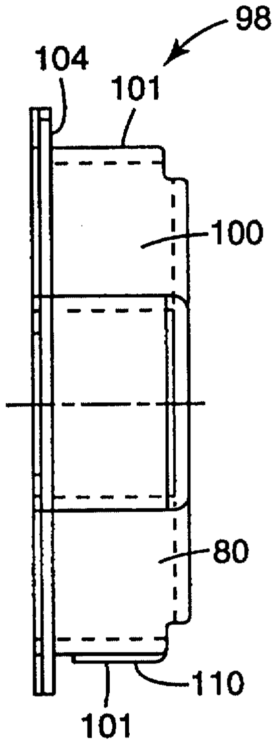
FIG. 16 is a side view of the tape hub of FIG. 13 as illustrated in FIG. 15.
Figure 17:
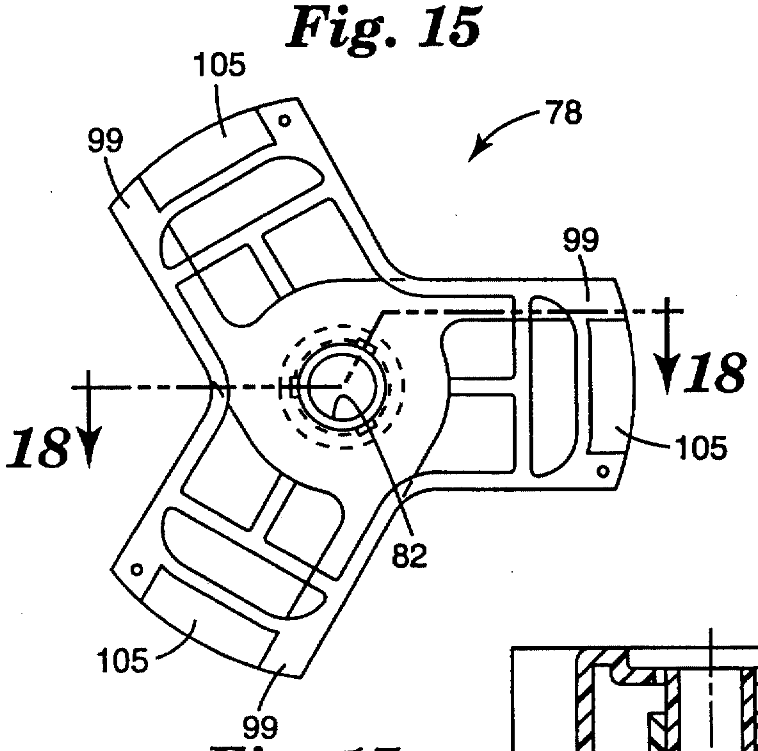
FIG. 17 is an inner end view of the tape hub of FIG. 13 as illustrated in FIG. 15.
Figure 18:
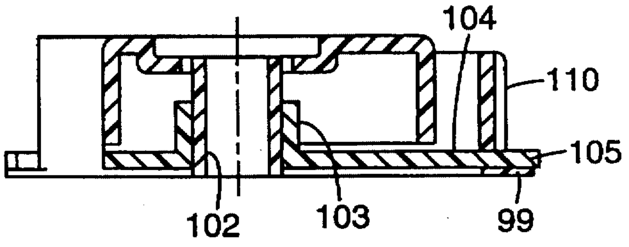
FIG. 18 is a sectional view taken approximately along line 18—18 of FIG. 17.

Referring now to FIG. 1 of the drawing their is illustrated a device 10 according to the present invention for use with a roll 11 of masking material 12 comprising a length of the masking material 12 helically wound around a core 14 and having opposite major surfaces, and first and second elongate edges 15 and 16; and with a roll 18 of tape 19 comprising a length of the tape 19 wound around a core 20 and comprising a backing having front and rear surfaces and first and second elongate edges 23 and 24, and a coating 25 of pressure sensitive adhesive on the front surface. The device 10 is essentially the same as the device described in U.S. Pat. No. 4,379,019 (the content whereof is incorporated herein by reference) except for (1) the improvement of a tape hub 38 according to the present invention described below, and (2) a manually releasable mechanism for removably attaching an assembly 27 on a frame 32 of the device 10 that carries an extra roll 29 of tape from which tape can be withdrawn as needed during a masking operation that is described in greater detail in U.S. Pat. No. 4,915,769, the content whereof is hereby incorporated herein by reference.

Generally, the device 10 comprises the frame 32 that includes a hub support portion 33 having opposite sides and includes a handle 35 adapted for manual engagement to manipulate the device 10. Tape and Masking material hubs 38 and 39 are mounted on the hub support portion 33 of the frame 32 for rotation about spaced generally parallel axes indicated by lines A and B respectively. The tape hub 38 includes a peripheral surface defined by axially extending ribs 40 that provides means for frictionally co-axially receiving the inner surface of the core 20 of the roll 18 of tape 19. The tape hub 38 also has a flange 41 at the ends of the ribs 40 adjacent the frame 32 for positioning the first edge 23 of the length of tape 19 at a predetermined tape edge position axially with respect to the tape and masking material hubs 38 and 39 with the second edge 24 of the length of tape 19 projecting past the frame 32. The masking material hub 39 is adapted to receive the core 14 of the roll 11 of masking material 12 and position the first edge 15 of the length of masking material 12 at a predetermined masking material edge position axially with respect to the tape and masking material hubs 38 and 39 with the width of the length of tape 19 extending from the tape edge position past the masking material edge position and the width of the length of masking material 12 extending from the masking material edge position past the tape edge position. Thus portions along the first edges 15 and 23 of the lengths of tape and masking material 19 and 12 are both positioned between the tape and masking material edge positions. Path defining means are provided by the hubs 38 and 39 and frame 32 for defining a path for the length of tape 19 from the tape supply roll 18 and a path for the length of masking material 12 from the roll 11 of masking material 12. Those paths include a tape path portion for the tape 19 from the roll 18 of tape 19 to the periphery of the roll 11 of masking material 12, and a common path portion beginning at the periphery of the roll 11 of masking material 12 where the portion of the length of tape 19 along its first edge 23 is adhered to the portion of masking material 12 along its first edge 15 to form a composite masking sheet 42. The composite masking sheet 42 has opposite edges defined by the second edges 24 and 16 of the length of tape 19 and the length of masking material 12, and an exposed portion of the layer 25 of adhesive along the second edge 24 on the length of tape (i.e., between the second edge 24 of the length of tape 19 and the first edge 15 of the masking material 12) extending along one major surface of the composite masking sheet 12. The exposed portion of the layer 25 of adhesive along the composite masking sheet 42 can be adhered along a surface to be masked to attach the composite masking sheet 42 thereto.

The path defining means includes a tracking member 50 mounted on the hub support portion 33 of the frame 32 at one end and by a gusset 51 in a position between the first and second hubs 38 and 39. Details of that tracking member 50 and its advantages are described in U.S. Pat. No. 4,990,214, the content whereof is incorporated herein by reference.

The device 10 further includes a cutting blade 44 having a serrated edge and mounted on the frame 32 transverse of the common path portion and positioned to afford engagement of the serrated edge of the blade 44 to sever the composite masking sheet 42. A suitable blade 44 is described in U.S. Pat. No. 4,913,767, and a guard (not illustrated) for use on that blade 44 is described in U.S. Pat. No. 4,989,769, the contents of which two patents are incorporated herein by reference.

The improvement in the device 10 according to the present invention is that the tape hub 38 includes means for alternately locating the first edge 23 of the length of tape 19 at either of two different discrete tape edge positions to thereby afford changing the width axially of the hubs 38 and 39 of the portion of the length of tape 19 along the first edge 23 of the length of tape 19 and the portion of the length of masking material 12 along the first edge 15 of the length of masking material 12 that are positioned between the tape edge and masking material edge positions and are thus adhered together by the device 10.

Referring now to FIGS. 1 through 5 of the drawing, The tape hub 38, which is molded of a suitable polymeric material such as an acrylonitrile-butadiene-styrene resin (ABS), includes a support portion 60 mounted on the frame 32 of that device 10 at a central bearing surface 37 for rotation about the axis indicated by the line A. The tape hub 38 includes a plurality of or three radially extending circumferentially spaced hub portions 59 having axially extending ribs 40 at their distal ends that define a peripheral surface 61 around the axis of the hub 38 that is adapted to frictionally and coaxially receive the cylindrical inner surface of the core 20 on which the tape 19 is wound. The means for alternately locating the first edge 23 of the length of tape 19 at either of two different discrete predetermined tape edge positions comprises (1) parts of the flange 41 fixed at one end of the support portion 60 adapted to be engaged by one side surface of the core 20 around which the tape 19 is wound to define an inner one of the two predetermined tape edge positions indicated by the dotted line 63 in FIG. 3, and (2) a plurality of cantilevered members 64 integral with the tape hub 38 that have proximal ends 65 attached to the support portion 60 of the hub 38 and distal ends 66 projecting above the peripheral surface 61 of the tape hub 38 and adapted to be engaged by the side surface of the core 20 on the peripheral surface 61 to define an outer one of the two predetermined tape edge positions indicated by the line 67 in FIG. 3. The cantilevered members 64 are resiliently flexible and have cam surfaces 68 on their distal ends 66 adapted to be engaged by the core 20 in the roll 18 of tape 19 when it is moved toward those cam surfaces 68 to thereby cause resilient deflection of the distal ends 66 below the peripheral surface 61 to afford axial movement of the core 20 over the distal ends 66 and into engagement with the flange 41 upon manual application of a predetermined force axially of the tape hub 38 to move the core 20 past the distal ends 66. Thus, a person can use a first level of force to push the roll 18 of tape 19 coaxially over the peripheral surface 61 of the tape hub 38 from its outer end and into engagement with the distal ends 66 (which engagement he can feel) and can leave it there to provide the smaller amount of overlap between the tape 19 and the masking material 12; or can apply sufficient additional force to push the roll 18 of tape 19 past the distal ends 66 of the cantilevered members 64 and into engagement with the flange 41, whereupon the cam surfaces 68 on those distal ends 66 cause the cantilevered members 64 to deflect and be positioned along the inner surface of the tape core 20.

The peripheral surface 61 of the tape hub 38 is adapted to accept nominally three inch diameter tape cores 20 of either United States or European origin (whether or not they are affected by tightly wound tape or humidity conditions) without any adjustment. Two of the axially extending ribs 40 are positioned on the distal end of each of the three spaced hub portions 59. The ribs 40 are positioned so that tape cores 20 of the largest inner diameter the tape hub 38 will accept (e.g., the cores of rolls 18 of tape 19 of United States origin) will frictionally engage the ribs 40 without significant deformation of the core 20, whereas the tape cores 20 of the smaller inner diameters that the tape hub 38 will accept (e.g., the cores 20 of rolls 18 of tape 19 of European and particularly British origin which are about 0.030 inch smaller) can also frictionally engage the ribs 40 by becoming slightly flattened in the spaces between the hub portions 59 and in the space between the ribs 40 on each hub portion 59. As an example, the two ribs 40 on each hub portion 59 can be spaced by about 1 inch, and the adjacent ribs 40 on adjacent hub portions 59 can be spaced by about 2 inches or about twice the distance between the ribs 40 on each hub portion 59.

Referring now to FIGS. 6 through 12 there is illustrated a second embodiment of a tape hub according to the present invention identified by the reference numeral 78 that could be used on the device 10 in place of the tape hub 38. Like the hub 38, the hub 78 can be mounted on the frame 32 of that device 10 at a central bearing surface 82 for rotation about the axis indicated by the line A. The tape hub 78 includes a support portion 80 defining a peripheral surface 81 around its axis adapted to frictionally receive the cylindrical inner surface of the core 20.

Means are provided on the tape hub 78 for alternately locating the first edge 23 of the length of tape 19 at either of two different discrete predetermined tape edge positions. That means comprises a plurality of, or six rotary members 84 mounted on the support portion 80 for rotary motion about their axes relative to the support portion 80 between inner and outer engaging positions. The rotary members 84 include outer projections 85 that project above the peripheral surface 81 and are adapted to be engaged by the side surface of the core 20 of the roll 18 of tape 19 around the peripheral surface 81 to define an outer one of the two predetermined tape edge positions illustrated by the dotted line 75 in FIG. 7 when the rotary members 84 are in their outer engaging positions. The rotary members 84 also include inner projections 83 that project above the peripheral surface 81 and are adapted to be engaged by the side surface of the core 20 of the roll 18 of tape 19 around the peripheral surface 81 to define an inner one of the two predetermined tape edge positions illustrated by the dotted line 76 in FIG. 7 when the rotary members 84 are in their inner engaging positions. The outer projections 85 are below the peripheral surface 81 to afford axial movement of the core into engagement with the inner projections 83 when the rotary members 84 are in their inner engaging positions. Thus, a user can either adjust the rotary members 84 so that the roll of tape can be pushed over the support portion 80 of the tape hub 78 into engagement with the outer projections 85 to provide the smaller amount of overlap between the tape 19 and the masking material 12, or into engagement with the inner projections 83 to provide the larger mount of overlap between the tape 19 and the masking material 12.

The rotary members 84 have the inner and outer radially projections 83 and 85 disposed at about 90 degree relationship about their peripheries at one of their ends, generally cylindrical central portions 87 about their axes that are slightly tapered away from the projections 83 and 85, and radially projecting retaining flanges 86 at their ends opposite the projections 83 and 85. The central portions 87 of the rotary members 84 are received in close fitting axially extending channels in cantilevered parts 88 of the support portion 80. Those channels extend over 180 degrees around the central portions 87 of the rotary members 84 and with those central portions 87 define the peripheral surface 81 of the tape hub 78. The retaining flanges extend along ends of the channels, and have projections 89 adapted to engage recesses 90 in the ends of the channels to help locate and retain the rotary members 84 in either of their inner and outer positions. The rotary members 84 can be rotated between their inner and outer positions by engaging a screwdriver or similar device in transverse slots 91 in their ends adjacent the retaining flanges 86.

The tape hub 78 can be adjusted to accept nominally three inch diameter tape cores 20 in rolls 18 of tape 19 of either United States or European origin (whether or not they are affected by tightly wound tape or humidity conditions). The channels have projections 92 from their sides opposite the peripheral surface 81 of the tape hub 78. Screws 93 rotatably mounted in a central part 96 of the tape hubs support portion 80 and rotatable by engaging a screwdriver with slots 94 in their ends have opposite tapered ends 95 (see FIG. 12) that by rotation of the screws 93 can be moved into or out of engagement with the projections 92. Movement of the tapered ends 95 of the screws 93 into engagement with the projections 92 causes resilient flexing of the cantilevered parts 88 radially outwardly of the central part 96 of the support portion 80 to increase the diameter of the hub's peripheral surface 81, whereas movement of those tapered ends 95 out of engagement with the projections 95 by reverse rotation of the screws 93 allows the cantilevered parts 88 to move radially inwardly of the tape hub 78 to decrease the diameter of its peripheral surface 81.

Referring now to FIGS. 13 through 18 there is illustrated a third embodiment of a tape hub according to the present invention identified by the reference numeral 98 that could be used on the device 10 in place of the tape hub 38. Like the tape hub 38, the tape hub 98 can be mounted on the frame 32 of that device 10 at a central beating surface 102 for rotation about the axis indicated by the line A. The tape hub 98 has a plurality of or three radially projecting spaced hub portions 97 and has a support portion 100 defining a peripheral surface 101 around its axis adapted to frictionally receive the cylindrical inner surface of the core 20 of the roll 18 of tape 19 when it is positioned around the peripheral surface 101.

Means are provided on the tape hub 98 for alternately locating the first edge 23 of the length of tape 19 at either of two different discrete predetermined tape edge positions. That means comprises (1) a flange 99 having parts fixed at an end of the support portion 100 adapted to be engaged by one side surface of the core 20 of a roll 18 of tape 19 around the peripheral surface 101 to define an inner one of the two predetermined tape edge positions, and (2) a rotary member 104 mounted on the support portion 100 by a collar 103 for rotary motion about and sliding motion along the axis of the tape hub 98 relative to the support portion 100 between engaging and disengaging positions. The rotary member 104 includes cantilevered flexible projections 105. In the engaging position of the rotary member 104 its flexible projections 105 are moved so that they project along the peripheral surface 101 and adjacent the flange 99 (see FIGS. 15 through 18) where they will be engaged by the side surface of the core 20 of the roll 18 of tape 19 around on the peripheral surface 101 to space the roll 18 of tape 19 from the flange 99 and define an outer one of the two predetermined tape edge positions. In the disengaged position of the rotary member 104 (see FIGS. 13 and 14) its projections 105 are positioned in the spaces between the hub portions 97 and generally in alignment with the flange 99 to afford axial movement of the core 20 into engagement with the flange 99. The projections 105 on the rotary member 104 are shaped and mounted by the collar 103 so that they will be biased against the parts of the flange 99 when in their engaging position, and the projections 105 have parts 106 adapted to removably engage recesses 107 along the parts of the flange 99 to help hold the projections in their engaging position. Thus, a user can either adjust the rotary member 104 so that the roll 18 of tape 19 can be pushed over the peripheral surface 101 on the support portion 100 of the tape hub 98 into engagement with the projections 105 to space the roll 18 of tape 19 from the flange 99 and provide the smaller amount of overlap between the tape 18 and the masking material 12, or so that the roll 18 of tape 19 can be pushed into engagement with the flange 99 to provide the larger amount of overlap between the tape 19 and the masking material 12.

Like the tape hub 38, the tape hub 98 is adapted to accept nominally three inch diameter cores in rolls of tape of either United States or European origin (whether or not they are affected by tightly wound tape or humidity conditions) without any adjustment. The peripheral surface of the tape hub 98 is defined by widely spaced axially extending ribs 110 on the three spaced hub portions 97. The ribs 110 are positioned so that the tape cores 20 of the largest inner diameter the tape hub 98 is adapted to accept (e.g., the cores in rolls of tape of United States origin) will frictionally engage the ribs without significant deformation of the core 20, whereas tape cores of slightly smaller inner diameters (e.g., the cores of rolls of tape of European or British origin which are about 0.030 inch smaller) can also frictionally engage the ribs by becoming slightly flattened in the spaces between the adjacent ribs 110 on adjacent hub portions 97 and in the spaces between the ribs 110 on each hub portion 97.

The present invention has now been described with reference to three embodiments thereof. It will be apparent to those skilled in the art that changes can be made in the embodiments described without departing from the scope of the present invention. Thus the scope of the present invention should not be limited to the structure described in this application, but only by structures described by the language of the claims and the equivalents of those structures.

We claim:

1. A portable device for use with a roll of masking material comprising a length of masking material helically wound around a masking material core and having opposite major surfaces and opposite first and second elongate edges, and a roll of tape comprising a length of tape helically wound around a tape core having a cylindrical inner surface, said tape comprising a backing having front and rear surfaces and opposite first and second elongate edges and a coating of pressure sensitive adhesive on said front surface, said portable device comprising:

a frame including a handle adapted for manual engagement to manipulate said device;

tape and masking material hubs mounted on said frame for rotation about spaced generally parallel axes, said tape hub including means for receiving the core of said roll of tape and for positioning the first edge of the length of tape at a predetermined tape edge position axially with respect to said first and second hubs, and said masking material hub including means for receiving the core of said roll of masking material and positioning the first edge of the length of masking material at a predetermined masking material edge position axially with respect to said tape and masking material hubs with the, width of said length of tape extending from the tape edge position past the masking material edge position and the width of the masking material extending from the masking material edge position past the tape edge position so that a portion of the length of tape along the first edge of the length of tape and a portion of the length of masking material along the first edge of the length of masking material are both positioned between said tape edge and masking material edge positions; and path defining means defining a path for said length of tape from said roll of tape and a path for said length of masking material from said roll of masking material, said paths including a tape path portion for said tape from said roll of tape to the peripheral surface of said roll of masking material and a common path portion beginning at the peripheral surface of said roll of masking material where said portion of the length of tape along the first edge of the length of tape is adhered to said portion of the length of masking material along the first edge of the length of masking material to form a composite masking sheet having opposite edges defined by the second edges of the length of tape and the length of masking material and an exposed portion of the coating of pressure sensitive adhesive along the second edge of the length of tape along one major surface of the composite masking sheet so that the exposed portion of coating of adhesive can be adhered along a surface to be masked to attach the composite masking sheet thereto;

wherein said tape hub includes means for alternately locating the first edge of the length of tape at either of two different discrete tape edge positions to thereby afford changing the width axially of said hubs of the portion of the length of tape along the first edge of the length of tape and the portion of the length of masking material along the first edge of the length of masking material that are positioned between said tape edge and masking material edge positions.

2. A portable device according to claim 1 wherein said tape hub includes a support portion defining a peripheral surface around said axis adapted to frictionally receive the cylindrical inner surface of said core, and said means on said tape hub for positioning the first edge of the length of tape at said predetermined tape edge position axially with respect to said first and second hubs and comprising means for alternately locating the first edge of the length of tape at either of two different discrete predetermined tape edge positions comprises a flange fixed at one end of said support portion adapted to be engaged by one side surface of the core to define an inner one of said two predetermined tape edge positions, and a plurality of cantilevered members having proximal ends attached to said support portion and distal ends projecting above said peripheral surface and adapted to be engaged by said side surface of the core on said peripheral surface to define an outer one of said two predetermined tape edge positions, said cantilevered members being resiliently flexible and having cam surfaces on said distal ends adapted to be engaged by the core and to thereby cause resilient deflection of said distal ends below said peripheral surface to afford axial movement of the core over said distal ends and into engagement with said flange upon manual application of a predetermined force axially of said hub to move the core past said distal ends.

3. A portable device according to claim 1 wherein said tape hub includes a support portion defining a peripheral surface around said axis adapted to frictionally receive the cylindrical inner surface of said core, and said means on said tape hub for positioning the first edge of the length of tape at said predetermined tape edge position axially with respect to said first and second hubs and comprising means for alternately locating the first edge of the length of tape at either of two different discrete predetermined tape edge positions comprises a flange fixed at one end of said support portion adapted to be engaged by one side surface of the core to define an inner one of said two predetermined tape edge positions, and a rotary member having an axis and being mounted on said support portion for coaxial rotary motion relative to said support portion between engaging and disengaging positions, said rotary member including projections projecting along said peripheral surface and adapted to be engaged by said side surface of the core on said peripheral surface to define an outer one of said two predetermined tape edge positions when said rotary member is in said engaging position and said projections being spaced from said peripheral surface to afford axial movement of the core over said distal ends and into engagement with said flange when said rotary member is in said disengaged position.

4. A portable device according to claim 1 wherein said tape hub has a plurality of radially extending hub portions having spaces therebetween and axially extending ribs on said hub portions defining a peripheral surface around said axis adapted to frictionally receive the cylindrical inner surface of cores of slightly different inner diameters.

5. A portable device according to claim 1 wherein said tape hub includes three radially extending hub portions having spaces therebetween and two axially extending circumferentially spaced ribs on each of said hub portions, adjacent ribs on adjacent hub portions being spaced by about twice the distance between the ribs on each of said hub portions and said ribs defining a peripheral surface around said axis adapted to frictionally receive the cylindrical inner surface of cores of inner diameters differing by over 0.03 inch.

6. A portable device according to claim 1 wherein said tape hub comprises means including a support portion for defining a peripheral surface around said axis adapted to frictionally receive the cylindrical inner surface of said core, and said means on said tape hub for positioning the first edge of the length of tape at said predetermined tape edge position axially with respect to said first and second hubs and comprising means for alternately locating the first edge of the length of tape at either of two different discrete predetermined tape edge positions comprises a plurality of rotary members each having an axis and mounting means mounting said rotary members on said support portion for rotary motion relative to said support portion between outer engaging and inner engaging positions, said rotary members including outer projections that project above said peripheral surface and are adapted to be engaged by said side surface of the core on said peripheral surface to define an outer one of said two predetermined tape edge positions when said rotary members are in said outer engaging positions, and inner projections that project above said peripheral surface and are adapted to be engaged by said side surface of the core on said peripheral surface to define an inner one of said two predetermined tape edge positions when said rotary members are in said inner engaging positions, said outer projections being positioned below said peripheral surface at the inner engaging positions of said rotary members.

7. A portable device according to claim 6 wherein said mounting means for mounting said rotary members on said support portion comprises said support portion having a central part and cantilevered outer parts each fixed at one end to said central part and supporting one of said rotary members, said rotary members and cantilevered outer parts defining said peripheral surface around said axis adapted to frictionally receive the cylindrical inner surface of said core, and said tape hub including manually adjustable means for moving said cantilevered outer parts between first and second positions to change the diameter of said peripheral surface around said axis to afford frictionally receiving the cylindrical inner surface of cores of slightly different inner diameters.

* * * * *